United States Patent [19]

Robinson

[11] Patent Number: 5,358,363

[45] Date of Patent: Oct. 25, 1994

[54] DEBURRING TOOL

[75] Inventor: William A. Robinson, Canton, Mich.

[73] Assignee: E-Z Burr Tool Company, Plymouth, Mich.

[21] Appl. No.: 164,745

[22] Filed: Dec. 9, 1993

[51] Int. Cl.⁵ ............................................. B23B 51/00
[52] U.S. Cl. ..................... 408/153; 408/180; 408/181
[58] Field of Search ............... 408/93, 153, 180, 181, 408/187

[56] References Cited

U.S. PATENT DOCUMENTS

| | | | |
|---|---|---|---|
| 3,017,791 | 1/1962 | Fried | 408/180 |
| 4,086,018 | 4/1978 | Robinson et al. | 408/226 |
| 4,147,463 | 4/1979 | Robinson | 408/156 |
| 5,277,528 | 1/1994 | Robinson | 408/201 |

Primary Examiner—Daniel W. Howell
Attorney, Agent, or Firm—Reising, Ethington, Barnard, Perry & Milton

[57] ABSTRACT

A deburring tool including an elongated arbor formed with a cutting blade recess, a unitary cutting tool having a cutting head, a trailing terminal portion, an elongated, flat resilient blade extending therefrom which is received in the recess and a mounting mechanism securing the cutting tool to the arbor. The mounting mechanism includes an adjustable screw threadably mounted in the arbor transversely of the longitudinal axis of the arbor for fixedly engaging the terminal portion of the cutting tool. The mounting mechanism also includes an adjustable locking screw extending transversely through the recess and the blade to define a pivot point about which the cutting tool can pivot and has a non-threaded hemispherical portion which terminates in a flat edge. The resilient blade includes an open ended slot having an arcuately closed end which presents a flat at one end of the arc of the slot. The hemispherical portion is received in this slot and adapted to rotate relative to the arcuate end of the slot until the flat edge of the hemispherical portion comes into abutting engagement with the flat in the slot to lock the blade within the arbor while permitting the resilient blade to pivot about the locking screw.

3 Claims, 2 Drawing Sheets

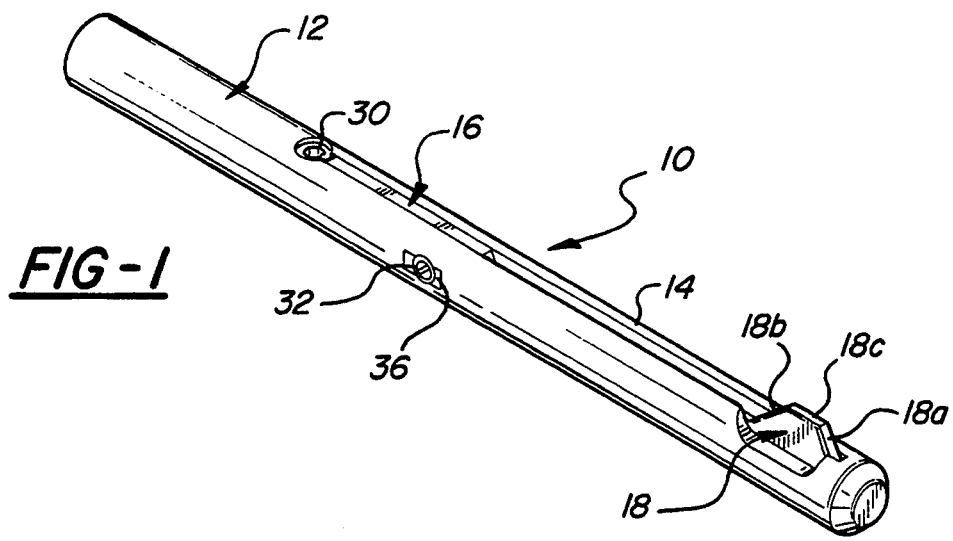
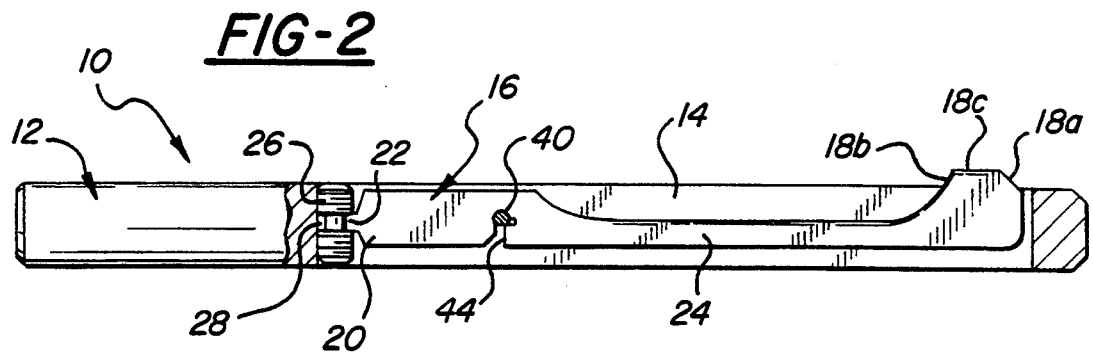
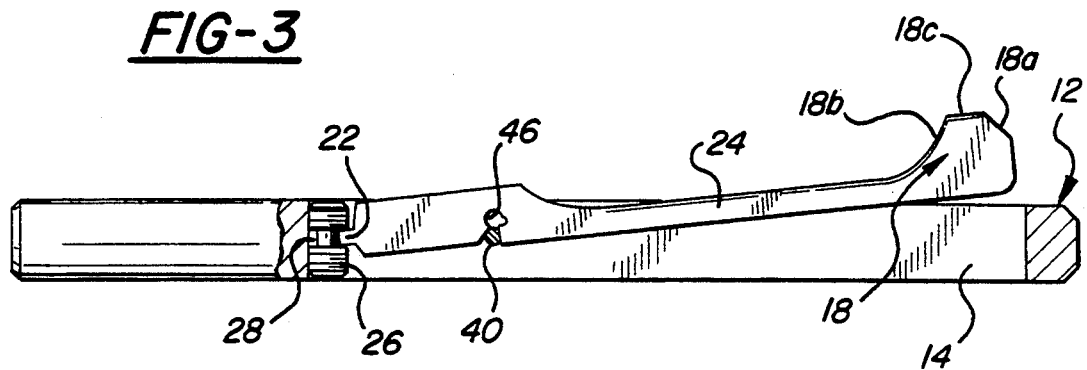

DEBURRING TOOL

BACKGROUND OF THE INVENTION

1. Technical Field

The subject invention relates to deburring tools and is particularly concerned with the construction of a deburring tool having a replaceable and adjustable cutting head.

2. Description Of The Prior Art

Deburring tools are generally employed to deburr passages bored through workpieces such as valve bodies and the like and to put a chamfer on the edges of the hole in the workpiece at the opening of the passages. Examples of deburring tools known in the prior art are disclosed by the present inventor, William R. Robinson along with James L. Roberts in U.S. Pat. No. 4,086,018 issued Apr. 25, 1978 and by William R. Robinson in U.S. Pat. No. 4,147,463 issued Apr. 3, 1979 for an adjustable deburring tool.

Deburring tools of this type generally include an elongated cylindrical arbor formed with a cutting blade recess. A unitary cutting tool is received in the recess and includes a cutting head with an integral, elongated, flat, resilient blade extending therefrom. The blade is mounted in the arbor by a pair of axially spaced pins, at least one of which, the roll pin, extends through a hole in the blade to define a pivot point about which the blade can flex.

The other pin engages the end of the blade opposite the cutting head and holds this end in non-pivotal relationship with respect to the arbor with the cutting head projecting from the recess for engaging the workpiece. The cutting head is thereby resiliently yieldable to permit the cutting head to move inwardly with respect to the recess during a deburring operation.

While deburring tools of the prior art generally perform satisfactorily, they are not without their problems. For example, in order to replace a worn out cutting tool, an operator must remove the deburring tool from the machine, drive the roll pin completely through the hole in the blade and out of the arbor, remove the old blade from the arbor, replace it with a new blade and then drive the roll pin back into the arbor and through the hole in the new blade. In addition to this complication, the roll pin has a limited useful life of approximately one to three blade changes.

Cutting blades used in the prior art are generally stamped from steel stock and a hole then drilled to accept the roll pin. The blade is then heat treated to increase its hardness. Recently, it has been found that cutting blades may be cut from hardened M-2 high speed tool steel stock using a wire electrical discharge machine. This improvement is disclosed by James R. Robinson in U.S. Ser. No. 925,957, now U.S. Pat. No. 5,277,528, directed toward a Micro Deburring Tool. However, problems have been encountered in the process of drilling the hole in the blade to accept the roll pin. In these cases, the drill is no harder than the blade and therefore will not bore the hole.

SUMMARY OF THE INVENTION AND ADVANTAGES

The subject invention overcomes the problems in the prior art in a deburring tool having an elongated arbor formed with a cutting blade recess and a unitary cutting tool made from M-2 high speed tool steel having a cutting head, a trailing terminal portion, and an elongated flat resilient blade extending therefrom. The cutting tool is received in the recess of the arbor. A mounting means is employed to secure the cutting tool to the arbor with the cutting head projecting from the recess. The mounting means includes an adjustable screw threadedly mounted in the arbor transversely of the longitudinal axis of the arbor for fixedly engaging the terminal portion of the cutting tool so as to determine the distance the cutting head projects from the recess. The mounting means also includes an adjustable locking screw extending transversely through the recess and the blade to define a pivot point about which the cutting tool can pivot. The locking screw includes a non-threaded hemispherical porion which terminates in a flat edge. The resilient blade includes an open ended slot having an arcuate closed end which presents a flat at one end of the arc of the slot. The hemispherical portion of the locking screw is received in the slot and is adapted to rotate relative to the arcuate end of the slot until the flat edge of the hemispherical portion comes into abutting engagement with the flat in the slot to lock the blade within the arbor while permitting the resilient blade to pivot about the locking screw.

The subject invention has the advantages that the cutting tool is made from very hard, M-2 high speed tool steel and can easily be replaced without the need to remove the deburring tool from the machine. Rather than driving roll pins in and out of the arbor, with the deburring tool of the present invention, an operator merely rotates the locking screw ¼ turn (90°) in the counter-clockwise direction such that the flat edge of the hemispherical portion is moved out of engagement with the flat presented in the slot of the blade. The worn cutting tool will then easily slide out of the arbor and a new tool substituted by reversing this procedure. Further, the locking screw lasts much longer than the roll pin of the prior art. Thus, the subject invention solves the problems in the prior art in a convenient, cost effective, deburring tool which is made using high quality tool steel and which increases the ease of changing worn out blades and thereby reduces the down time in any deburring operation so as to increase the efficiency of this process.

DESCRIPTION OF THE DRAWINGS

Other advantages and features of the invention will become apparent from the following description taken in connection with the accompanying drawings in which:

FIG. 1 is a perspective view of the deburring tool of the subject invention;

FIG. 2 is a cross-sectional side view of the deburring tool of the subject invention;

FIG. 3 is a cross-section side view illustrating the hemispherical portion of the locking screw being received in the slotted blade;

DETAILED DESCRIPTION OF THE BEST MODE OF CARRYING OUT THE INVENTION

Figure 4:
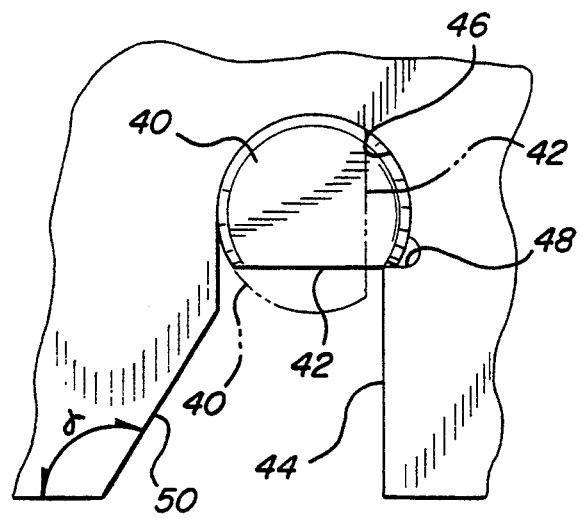
FIG. 4 is a side view of the slotted blade with the locking screw disposed in its locked position in full lines and unlocked position in phantom.

The deburring tool of the subject invention is generally shown at 10 in FIG. 1 and includes an elongated arbor, generally indicated at 12, and having a cutting blade recess 14 extending parallel to the longitudinal axis of the arbor 12 for a predetermined distance. The deburring tool 10 also includes a unitary cutting tool, generally indicated at 16, which is cut from M-2 high speed tool steel stock using a wire electrical discharge machine (EDM).

The cutting tool 16 includes a cutting head, generally indicated at 18, a trailing terminal portion, generally indicated at 20, and having a rearwardly projecting tang 22 and an elongated flat resilient blade 24 extending therebetween which is received in the cutting blade recess 14. The deburring tool 10 also includes a mounting means for securing the cutting tool 16 to the arbor 12 such that the cutting head 18 projects from the recess 14 as will be described in greater detail below.

The mounting means includes an adjustable screw 26 which is threadedly mounted in the arbor 12 transversely of the longitudinal axis of the arbor 12 and fixedly engages the terminal portion 20 of the cutting tool 16 so as to determine the distance the cutting head 18 projects from the recess. More specifically, the screw 26 is formed with a central non-threaded portion 28 defining an annular groove which receives the rearwardly projecting tang 22 of the terminal portion 20. The tang 22 projects into engagement with the adjustable screw 26. A hexagon tool recess 30 is formed in one end of the screw 26 for receiving a tool (not shown) to rotatably adjust the screw 26.

The mounting means also includes a locking screw 32 spaced from the adjustable screw 26 which extends transversely through the recess 14 and the blade 24 to define a pivot point about which the cutting tool 16 can pivot. Rotation of the adjustable screw 26 in the arbor 12 causes the blade 24 to pivot about the locking screw 32 to adjust the unstressed position of the cutting head 18 with respect to the arbor 12.

Figure 5:
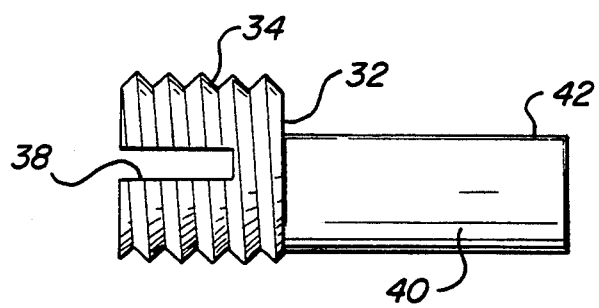
FIG. 5 is a cross-sectional side view of the locking screw.
Figure 6:
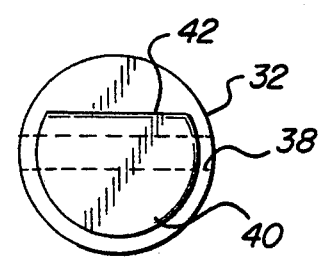
FIG. 6 is a cross-sectional front view of the locking screw.

Refering now to FIGS. 4, 5 and 6, the locking screw 32 includes a threaded portion 34 which is received within a threaded hole 36 of the arbor 12. The locking screw 32 includes a slot 38 in the end of the threaded portion 34 for receiving the blade of a screwdriver (not shown) to rotate the locking screw in the arbor. It should be noted, however, that the locking screw could be adapted to receive any type of conventional tool such as a phillips head screwdriver or allen wrench having a hexagonal head.

The locking screw 32 also includes a nonthreaded hemispherical portion 40 extending from the threaded portion 34 and which terminates in a flat edge 42. The hemispherical portion 40 and its flat edge 42 interact with the blade 24 of the cutting tool 16 as described below.

The blade 24 includes an open ended slot 44 extending into the middle of the blade from the base thereof and has an arcuate closed end 46. At one end of the arc which defines the arcuate closed end 46 is a flat 48. As best shown in FIG. 4 in phantom lines, the hemispherical portion 40 of the locking screw 32 is received in the slot 44 as the blade is mounted in the recess 14 of the arbor but only when the flat edge 42 of the hemispherical portion is substantially parallel to the longitudinal axis of the slot 44. Rotation of the threaded portion 44 ¼ turn or 90° within the threaded hole 36 of the arbor 12 causes the hemispherical portion 40 to rotate relative to the arcuate end 46 of the slot 44 until the flat edge 42 comes into abutting engagement with the flat 48 in the slot 44 to lock the blade 24 within the arbor 12. At the same time, the blade 24 is permitted to pivot about the locking screw 32 during deburring operations as will be explained in greater detail below.

As best shown in FIGS. 3–4, the slot 44 includes a lead in portion 50 which defines an obtuse angle α with respect to one side of the blade 24. This structure facilitates the slot 44 easily receiving the hemispherical portion 40 when the blade is being mounted within the recess 14 of the arbor 12. Similarly, when it is time to change a worn out cutting tool 16, the flat edge 42 is rotated out of engagement with the flat 48 in the slot by rotation of the threaded portion 34 of the screw 32 and the blade 24 is simply lifted out of the arbor. This operation can be performed while the arbor remains mounted in a machine used to drive the deburring tool.

As indicated earlier, the cutting head 18 is supported by the blade 24 in an operable position in which it projects from the recess 14 in the unstressed condition of the blade 24 shown in FIGS. 1 and 2. However, the portion of the blade 24 between the cutting head 18 and the slot 44 is resiliently yieldable so that the cutting head 18 can move inwardly with respect to the recess 14 as illustrated in FIG. 7.

The cutting head 18 includes a top, non-cutting surface 18C with a leading cutting edge 18A and a trailing cutting edge 18B extending angularly from the opposite ends of the top edge 18C. Fixture 7 illustrates a workpiece W in cross-section formed with a hole 52. The hole 52 may be formed by drilling or some other operation. The hole 52 has a leading edge 54 and a trailing edge 56.

Figure 7:
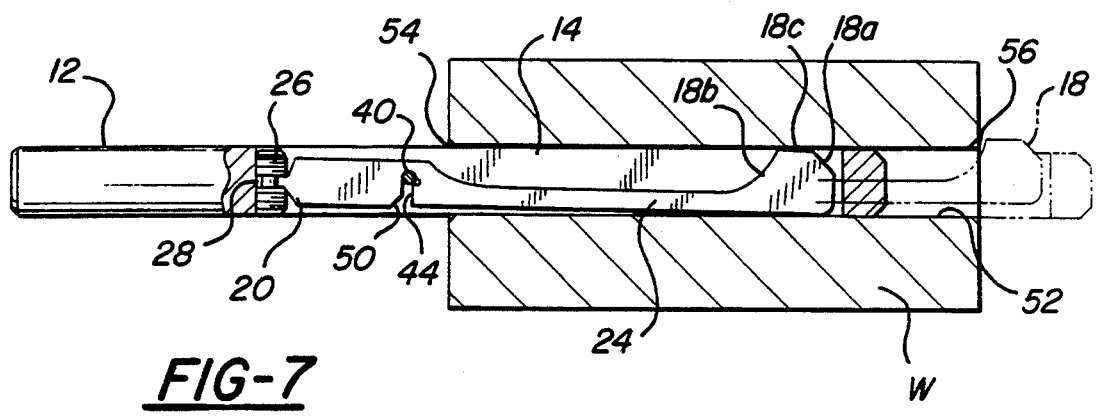
FIG. 7 is a sectional view of the deburring tool of the subject invention disposed within a workpiece with the cutting head of the deburring tool shown in an intermediate position within the hole of the workpiece in full lines and in reverse deburring position in phantom lines.

At the beginning of the deburring operation, the arbor 12 mounted in a rotating chuck or tool holder is rotated and advanced toward the right, as viewed in FIG. 7, with the leading edge 18A engaging the leading cutting edge 54 of the hole 52 to remove burrs and form a slight chamfer as indicated by reference numeral 54 in FIG. 7. The arbor first engages the end 54 of the hole 52 and advances to the right to the phantom line position illustrated in FIG. 7. The top, non-cutting edge 18C resiliently engages the wall of the hole 52 as the blade moves toward the right through the hole 52.

When the cutting head 18 clears the trailing end of the hole 52 at 56, as indicated in phantom lines in FIG. 7, the direction of the movement of the tool is reversed and the trailing cutting edge 18B removes burrs and slightly chamfers the trailing end 56 of the hole 52 of the workpiece W. As the blade is withdrawn toward the left in FIG. 7, the engagement of the trailing edge 18B with the end 56 of the hole 52 causes the blade 24 to yield and permit the cutting head 18 to assume the full line position shown in FIG. 7 as the tool is withdrawn toward the left from the hole 52 of the workpiece W. The amount of pressure applied by the cutting edges 18A and 18B is determined by the resiliency of the portion of the blade 24 between the slot 44 and the head 18 in the unstressed position of the cutting head 18.

While a specific form of the invention is described in the foregoing specification and illustrated in the accompanying drawings, the invention is not limited to the exact instructions shown. To the contrary, alterations in the construction and arrangement of parts, all falling within the scope and spirit of the invention, will be apparent to those skilled in the art.

What is claimed is:

1. A deburring tool comprising;

an elongated arbor formed with a cutting blade recess, a unitary cutting tool having a cutting head, a trailing terminal portion, and an elongated, flat resilient blade extending therebetween and received in said recess and mounting means securing said cutting tool to said arbor such that said cutting head projects from said recess;

said mounting means including an adjustable screw threadably mounted in said arbor transversely of the longitudinal axis of said arbor for fixedly engaging the terminal portion of said cutting tool so as to determine the distance said cutting head projects from said recess and an adjustable locking screw extending transversely through said recess and said blade to define a pivot point about which said cutting tool can pivot, said locking screw having a non-threaded hemispherical portion which terminates in a flat edge;

said resilient blade including an open ended slot having an arcuate closed end which presents a flat at one end of the arc of said slot, said hemispherical portion of said locking screw being received in said slot and adapted to rotate relative to said arcuate end of said slot until said flat edge of said hemispherical portion comes into abutting engagement with said flat in said slot to lock said blade within said arbor while permitting said resilient blade to pivot about said locking screw.

2. A deburring tool as set forth in claim 1 further characterized by said slot including a lead in portion which defines an obtuse angle $\alpha$ with respect to one side of said blade to facilitate receiving said hemispherical portion of said locking screw when said blade is mounted in said arbor.

3. A deburring tool as set forth in claim 2 further characterized by said locking screw including a threaded portion received within a threaded hole of said arbor such that rotation of said threaded portion causes rotation of said hemispherical portion to lock said blade within said arbor.

* * * * *